Figure 1:
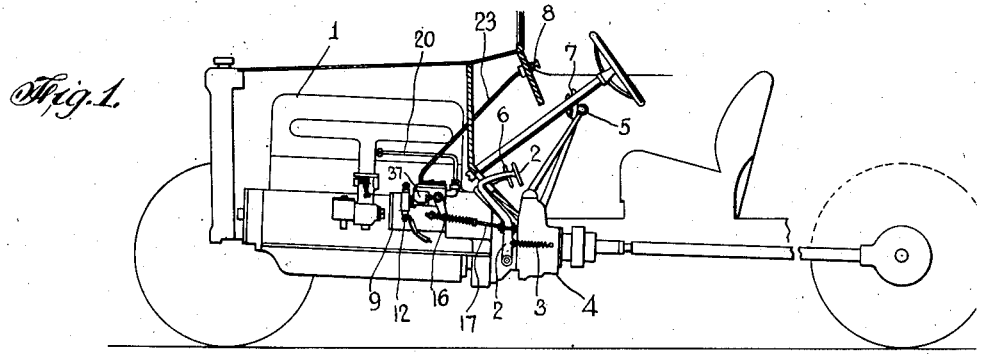

Jan. 13, 1931.  J. GOOD ET AL  1,788,713

ENGINE STARTING SYSTEM

Original Filed Nov. 6, 1926   2 Sheets-Sheet 1

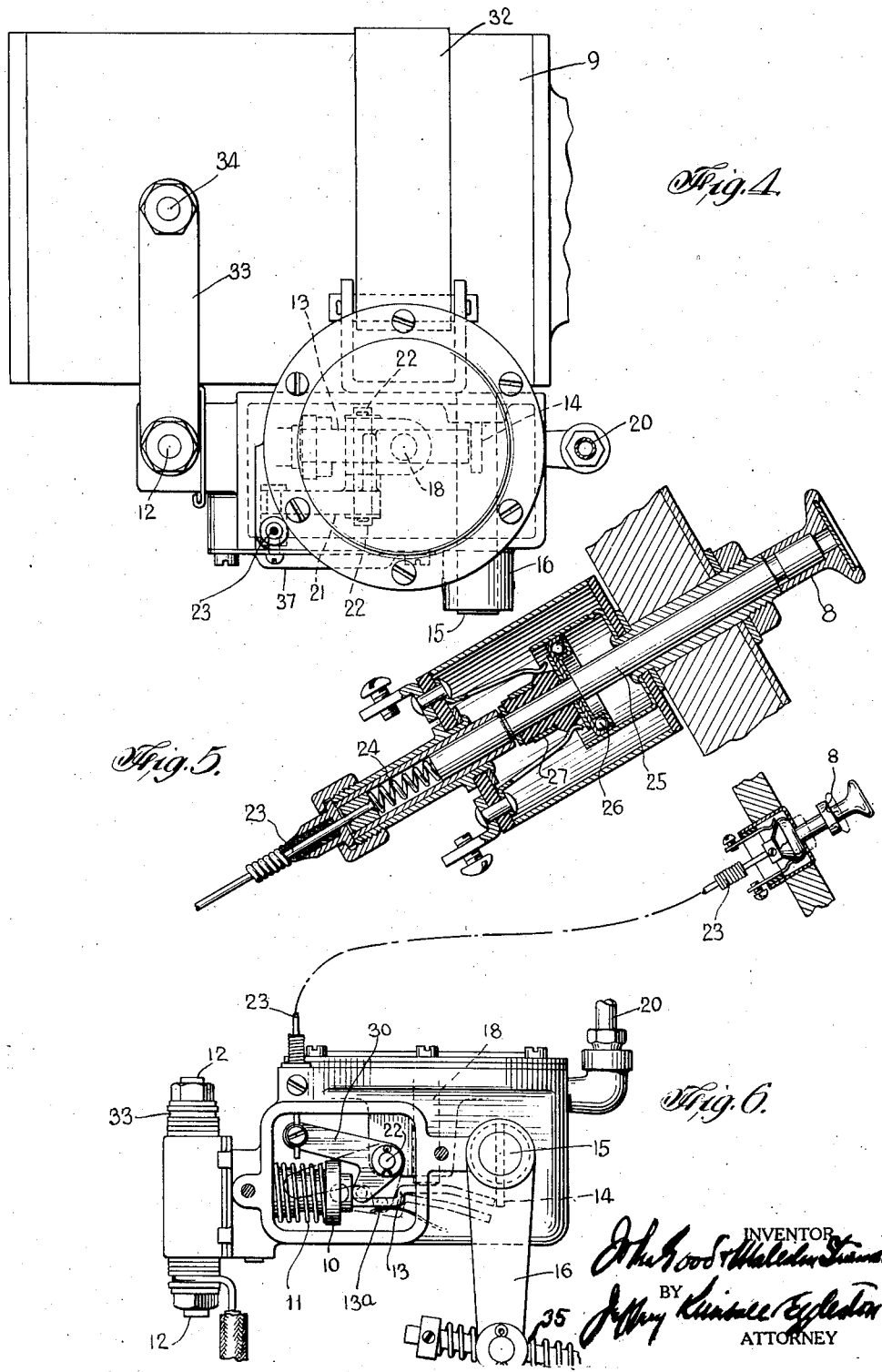

Patented Jan. 13, 1931

1,788,713

UNITED STATES PATENT OFFICE

JOHN GOOD, OF GARDEN CITY, AND MALCOLM STEVENSON, OF WESTBURY, NEW YORK, ASSIGNORS TO AUTOMATIC MOTOR STOP AND START, INC., OF NEW YORK, N. Y., A CORPORATION OF NEW YORK

ENGINE-STARTING SYSTEM

Application filed November 6, 1926, Serial No. 146,822. Renewed November 18, 1930.

The object is to simplify the operation of starting automobile engines whereby various advantages are obtained as below made apparent.

The drawing illustrates the principles of invention in one of the various possible forms in which they can be embodied and in one modification of that particular form.

Figure 1 shows a conventional automobile having the invention applied.

Figure 2:
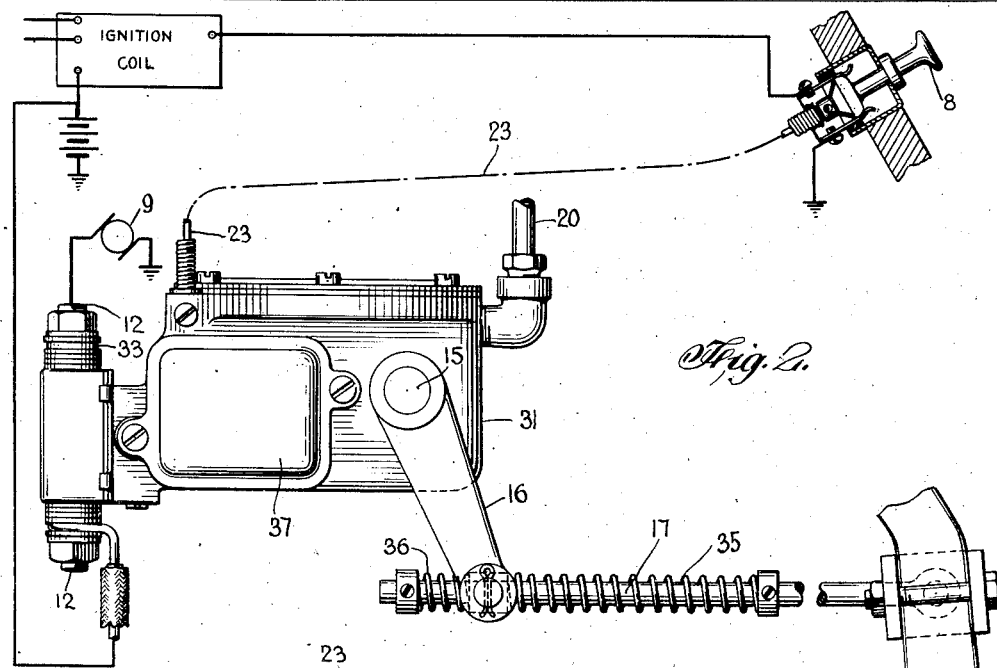

Figure 2 a larger scale elevation of the starting switch connections and the ignition switch, including the circuits in diagram.

Figure 3:
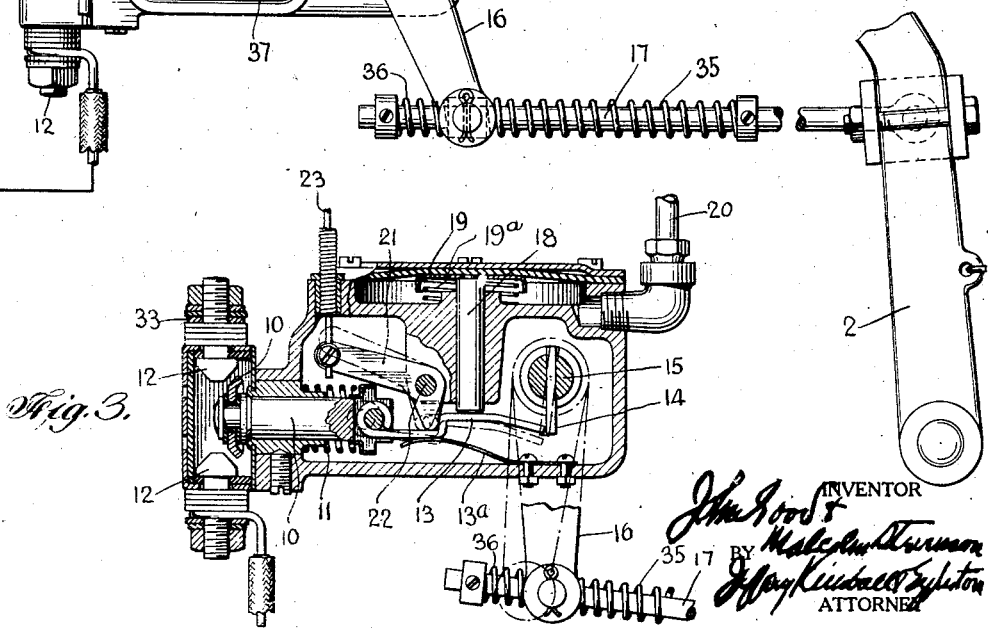

Figure 3 a vertical section of Fig. 2.

Figure 4 a plan thereof.

Figure 5 a modification of the ignition switch and

Figure 6 a modification of the ignition control.

Referring to Figures 1 to 4, the automobile shown comprises a suitable propelling engine with the usual power transmission line including a clutch, change-gear set, and propeller-shaft connected to the rear wheels, all as usual. The clutch proper does not appear in the drawing but will be understood to be opened by depressing the driver's clutch pedal 2 and closed by allowing it to return to its usual position under the influence of a suitable clutch-spring. The change-gear set 4 is controlled by the usual gear shift lever 5, to change the drive ratio of the engine on the propeller shaft. The clutch pedal 2 and the gear shift lever 5 are both operator's control members used by the driver for controlling the motion of the car. The usual brake pedal 6 and the emergency hand brake lever at 7 are also shown, these being other operator's control members, as will be understood. The ignition system is only partly illustrated in Fig. 2 but may be assumed to comprise any conventional circuit which may be controlled by a manual switch, such as indicated at 8 and which is commonly mounted on the instrument board. The particular form of switch shown is closed when pulled outwardly, but there is no limitation to any particular type or location of the ignition switch, except that it is desirably located near the operator.

The engine has a starting or cranking device in the form of an electric motor 9, shown of the type which automatically engages with teeth on the engine flywheel to crank the engine, but other types can also be used with appropriate modification, including those in which the motor, when driven by an engine becomes the generator for supplying ignition and charging the storage battery, and those in which the motor is manually engaged with the flywheel or with the engine on starting, etc. The circuit for the cranking motor, of whatever type, includes an operating member, or starting switch, which in the common automobile, is in the form of a foot-operated button or plunger projecting through the floor board where the operator can reach it. The process of starting the engine of such an automobile requires that the ignition switch be closed and that the power transmission line be opened, either by opening the clutch or by putting the gear lever in neutral position thus to disconnect the engine from the vehicle wheels, before pressing the starting button. In many cases it also requires the brakes to be set to keep the car from moving when thus disconnected and some degree of skill is required for properly manipulating all these members, especially when the car is on an incline, or when the engine is stalled in traffic. The difficulty is largely due to the fact that it is inconvenient to remove either foot from a foot pedal in order to press the starting button.

By the present invention one of the normal control members of the automobile, and preferably the clutch pedal 2, is arranged to do the work of the starting button so that the engine can be started without special attention or effort by the operator and without interfering with the normal function of the control member used, thereby enabling him to start the engine and automobile very promptly under all conditions. The mechanism requisite for this improvement in operation affords other advantages as will appear below, tending to simplify the construction and avoid waste of current.

Referring to Fig. 3, the starting switch for the cranking motor 9 is closed by movement of the plunger contact 10 against the pressure of the spring 11, which connects the two terminals 12 of the starting circuit, thus energizing the motor and in the present case causing it to engage automatically with the flywheel and revolve the latter as usual and as above stated. The switch contact member 10 is moved by the action or partial action of one of the control members normally used by the operator in driving the car, desirably by one of the two members which are used to open or interrupt the power transmission line to the vehicle wheels and preferably by the clutch pedal 2. The use of either the clutch pedal or the gear shift lever for the operation of the starting switch, insures that the engine will be free of the vehicle load when being cranked. The plunger contact member 10 carries a latch 13 adapted to be engaged by the short crank arm 14 of a rock shaft 15, the other arm 16 of which is operated by a rod 17 connecting it to the clutch pedal 2, so that depression of the latter may thus close the starting circuit. One of the connecting elements between the pedal and the switch is arranged to be effective or ineffective for transmitting the pedal motion, according as the condition of the engine may require, and in the present case, the latch 13 is such selector element being for this purpose hinged to the rear end of the switch plunger 10 and urged to its effective position by a spring 13a and movable from that position to its other position by the downward action of the stem 18 of a diaphragm 19 or equivalent device. The diaphragm is subject to the suction effect in the engine intake, through a tube connection 20, so that when the engine is running on its own combustion or at a speed at which stalling is not possible and which may be termed the normal running condition, the intake suction acting through the diaphragm stem 18 pushes the connecting member 13 out of engagement with, or out of the range of, the crank arm 14. In the one position, in which the engine is dead, the control member 2 may close the starting switch; in the other, which coincides with a normally running engine, it has no effect on the cranking device, but in both cases is available for its normal use by the operator.

The parts shown can be arranged so that the pedal can be used to hold the switch closed as long as desired, but preferably the design is such that as soon as the engine begins to fire the diaphragm stem 18 immediately kicks the connector out of contact with the crank member 14, thus tending to save starting current. It will be noted in this connection that when the clutch pedal, or other manual control, is operated the crank arm 14 "pinches" the latch 13 against the resistance of the contact member 10 or, in other words, the starter contacts are held firmly together throughout the starting period and there is no tendency for the contacts to separate while the engine is being turned over. The importance of this arrangement is even more pronounced in its relation to the use of a suction-governed device as the automatic release in that the cranking speed and hence the suction effect in any given car is a variable quantity, being perhaps as low as 50 R. P. M. in winter and as high as 200 or 150 R. P. M. in summer. It is necessary therefore to have some means during starting for positively preventing the operation of the circuit breaker at least until substantially the peak of the vacuum (coincident with combustion within the cylinders) is reached. It is also necessary on the other hand that the release operate at all other times as the result of relatively small suction increases—as when the clutch is disengaged during normal running of the car, as above explained—and hence it will be seen that seasonal or other variations in the suction effect cannot be compensated for by the use of an equivalently strong spring 19a, that is, by one which would only yield when the suction peak is reached, as there would then be no operation of the release at any time other than during the starting operation. That these several requirements are fulfilled by the present invention will be readily apparent and as will be more apparent hereinafter the necessary locking or "pinching" action is effected by the operation of the manual control but independently of the varying pressure which may be exerted by any individual operator. The suction-governed connector constitutes the preferred but not the only means whereby the speed condition of the engine may govern the use of the operator's control member for the extra function of energizing the cranking device; other fluid media normally present in the engine might be used, including the electric current generated by the engine for charging the battery, since all that is necessary is to impart a change of position or condition of some part of the operating line between the control member and the cranking device.

As further aid to the starting of the engine, the drawings show means whereby the actuation of the cranking device in the manner described may also close the ignition circuit, thus relieving the operator of the necessity of manually performing that act and saving time accordingly. This feature constitutes the subject of a copending application by John Good, Serial No. 152,535; filed December 4, 1926. For this purpose the bell crank 21, pivoted on a stud 22, has its shorter arm arranged to be engaged by a shoulder on the connector element 13 so as to be rocked on its pivot when the starting switch is closed. This bell crank movement is transmitted through a Bowden wire 23 or other transmitting connection to the stem of the ignition switch 8 so as to close it, i. e., push it out to its closed position. It is generally sufficient if such closure occurs simultaneously with the closing of the starting circuit, but a slight delay of ignition is preferable and can be accomplished by introducing a dash-pot or the like in the Bowden wire connection, as shown, for example, in Fig. 5. Here the Bowden wire 23 acts to compress a spring 24 and through the latter moves the stem 25 of the switch button 8, but only at the rate permitted by the dash pot plunger 26, thus causing the switch to close a moment after the starting switch and when the engine is turning over. The ignition switch will be understood from the drawings; the circuit is closed by the spring fingers which snap against the insulated metal ring 27.

Whether or not provided with a retarding device, the ignition switch may be located elsewhere than on the instrument board, but in that position it is easily accessible to the operator for stopping the engine, or for manual closure when preferred. Inasmuch as the engine can be started by the simple depression of a pedal, and without performing any motions not employed while the car is in motion, it becomes practical and also convenient for the operator to follow the practice of stopping his engine (by touching the convenient ignition switch) whenever he stops the car, as for example, on making traffic stops, thus accomplishing much economy in energy and engine wear. The next depression of the clutch pedal restarts the engine, the power transmission line being then open, as it should be, and the engine is thus running and ready for propelling the car as soon as the pedal is returned.

Referring to Fig. 6, the construction is identical with Fig. 3, except that the ignition bell crank, here marked 30, is out of the path of the shoulder on the connector element 13 and therefore not moved by the pedal when the latter is used for cranking the engine. In this form, the ignition switch controls the connector element. When the switch is opened, i. e., button 8 pressed down, the lower arm of the bell crank 30 depresses the connector element 13 against its spring so as thus to prevent or block closure of the starting circuit by use of the clutch pedal. When the ignition switch is closed, the connector element resumes its effective position in the range of the crank 14, staying there until displaced by the action of the engine-governed member 18 as before. In this form the cranking device cannot be used unless the ignition system is turned on.

The several parts above described, except the ignition switch, are contained in a suitable casing 31 which can be variously designed and variously located on the engine or otherwise, so as to be convenient to the pedal which operates it. In the present case, it is strapped by a band 32, Fig. 4, to the casing of the starting motor 9, in which position the live terminal 12 of the starting switch is close to the motor terminal 34 and can be connected to it by a short copper strap 33, the cover of the diaphragm chamber being thus easily accessible. In any position of the casing, the operating crank arm 16 is desirably engaged to the connecting rod 17 through the intervention of springs, such as 35 and 36, which not only serve to protect the electric switch or switches from excessive pressure and at the same time avoid interference with the normal position of the clutch pedal, but also provide that the locking or "pinching" of the latch 13, above referred to, is effected by a constant pressure independently of that exerted by the operator; otherwise, the operator, by exerting sufficient pressure might lock the latch 13 against all possibility of disengagement by the plunger 18 even after the engine had started. The spring 35 and also the spring of plunger 10 serves a further and incidental function in that their tension, added to the tension of the clutch spring or springs imposes a further resistance which the operator must overcome when starting the engine, thus indicating to him that the clutch pedal is about to close the starting circuit.

The enclosing casing 31 is provided with a removable cover 37 (Fig. 2) to give access to the interior and the bell crank connection to the Bowden wire so that the apparatus can readily be installed on different types of cars.

It should be noted that the chief function of the diaphragm 19, or such other engine-governed member as might be substituted for it, is to prevent closure of the starting switch at times when the engine is already running and as the result of the normal or "driving" use of the control member. It is important to guard against such untimely actuation of the cranking motor but much of the advantage of the present invention will be obtained if such actuation is not guarded against by the automatic means above described or by any automatic means whatever, so long as the single control member or pedal is available to the operator for use at will for either one or both of its two functions, thus permitting him to restart a stalled engine without removing either foot from a pedal.

We claim:

1. In an automobile, the combination of a propelling engine, an engine-cranking motor, a circuit therefor having a break and a movable contact for closing the same, spring means normally urging said contact toward open position, a manual control member, an operating connection between said control member and said contact, whereby the latter is manually operable, against the action of said spring, and engine operated means for positively breaking said connection whereby said spring means moves said contact to open said circuit break independently of movement of the control member.

2. In an automobile, the combination of a propelling engine, an engine-cranking motor, a circuit therefor having a break and a movable contact for closing the same, spring means normally urging said contact toward open position, a manual control member, an operating connection between said control member and said contact, and suction operated means for positively breaking said connection in response to engine operation, whereby said spring means moves said contact to open said circuit break independently of movement of the control member.

3. In an automobile, the combination of driving wheels, a propelling engine, a power transmission line from the engine to the wheels, an operator's control member serving to control the continuity of said line, an engine-cranking motor, a circuit therefor having a break and a movable contact for closing the same, spring means normally urging said contact toward open position, an operating connection between said control member and said contact, and engine operated means for positively breaking said connection whereby said spring means moves said contact to open said circuit break independently of movement of the control member.

4. In an automobile, the combination of a propelling engine, an engine-cranking motor, a circuit therefor having a break and a movable contact for closing the same, a manual control member, a movable connecting element interposed between said control member and contact and movable from a position in which it transmits control member movement to said contact to close said circuit, to a position in which operation of the control member is ineffective to close said circuit, and engine operated means for moving said connecting element independently of movement of said control member.

5. In an automobile, the combination of driving wheels, a propelling engine, a power transmission line from the engine to the wheels, an operator's control member serving to control the continuity of said line, an engine-cranking motor, a circuit therefor having a break and a movable contact for closing the same, an operating connection between said control member and said contact, and engine operated means for rendering said connection ineffective to move said contact in response to operation of said control member.

6. In an automobile, the combination of driving wheels, a propelling engine, a power transmission line from the engine to the wheels, an operator's control member serving to control the continuity of said line, an engine-cranking motor, a circuit therefor having a break and a movable contact for closing the same, an operating connection between said control member and said contact, a fuel intake to the engine, suction responsive means for rendering said connection ineffective to move said contact in response to operation of said control member, and a connection between said means and the engine intake.

7. In an automobile, the combination of a propelling engine, an engine-cranking motor, a circuit therefor having a break and a movable contact for closing the same, an engine operated release mechanism for the contact acting to permit the same to occupy its open position, and a manual contact operating member restraining the operation of said release mechanism.

8. In an automobile, the combination of a propelling engine, an engine-cranking motor, a circuit therefor having a break and a movable contact for closing the same, a suction operated mechanism for releasing the contact in response to engine operation, and a manual contact closing member adapted to delay the operation of said release mechanism.

9. In a starting system, the combination of an engine, and a fuel intake thereto, a starting motor, a circuit therefor and a switch in said circuit, suction means normally operative in response to relatively low vacuum in the engine intake to render the switch ineffective to close said circuit and means operative during engine starting to restrain the operation of said suction means until a relatively high vacuum occurs in the intake.

10. In a starting system, the combination of an engine, a starting motor, a circuit therefor and a switch in said circuit, manual means for closing said switch and engine operated means functioning independently of the release of said manual means and operable to effect opening of said switch, said manual means delaying the operation of the engine-operated means only until the engine starts.

In testimony whereof, we have signed this specification.

JOHN GOOD.
MALCOLM STEVENSON.